United States Patent [19]
Whitehead

[11] Patent Number: 5,365,871
[45] Date of Patent: Nov. 22, 1994

[54] ATTACHMENT TO ADAPT AN ELONGATED MEMBER

[75] Inventor: Nelson J. Whitehead, 204 Kingslynn Drive, P.O. Box 263, King City, Ontario, Canada, L0G 1K0

[73] Assignee: Nelson J. Whitehead, King City, Canada

[21] Appl. No.: 996,591

[22] Filed: Dec. 24, 1992

Related U.S. Application Data

[63] Continuation-in-part of Ser. No. 894,903, Jun. 8, 1992, abandoned.

[51] Int. Cl.⁵ ............................................... B63B 21/00
[52] U.S. Cl. .................................................. 114/218
[58] Field of Search ............................... 114/219, 230; 403/407.1, 245, DIG. 8, 348, 409.1, 374, 364

[56] References Cited
U.S. PATENT DOCUMENTS

| | | |
|---|---|---|
| 3,982,841 | 9/1976 | Endzweig ........................... 403/348 |
| 4,035,097 | 7/1977 | Bachand ............................. 403/348 |
| 4,430,019 | 2/1984 | D'Alessio .......................... 403/409.1 |
| 4,518,278 | 5/1985 | Koch .................................. 403/407.1 |
| 4,584,958 | 4/1986 | Green . |
| 4,728,215 | 3/1988 | Martincic et al. ............... 403/407.1 |
| 4,809,495 | 3/1989 | Ramunas ..................... 403/DIG. 8 |
| 4,873,934 | 10/1989 | Renault . |
| 4,899,423 | 2/1990 | Randall . |
| 4,907,521 | 3/1990 | Kresse . |

*Primary Examiner*—Stephen P. Avila
*Attorney, Agent, or Firm*—Ivor M. Hughes; Neil H. Hughes; Marcelo K. Sarkis

[57] ABSTRACT

An attachment to adapt an elongated member to be used with a female receptacle having cleat receiving means, the attachment comprising at least two mating parts which when assembled fit over a segment of the elongated member forming a cleat when assembled having two ends and having a male portion dispose proximate one end thereof remote said segment, said male portion to be received in said female receptacle.

7 Claims, 13 Drawing Sheets

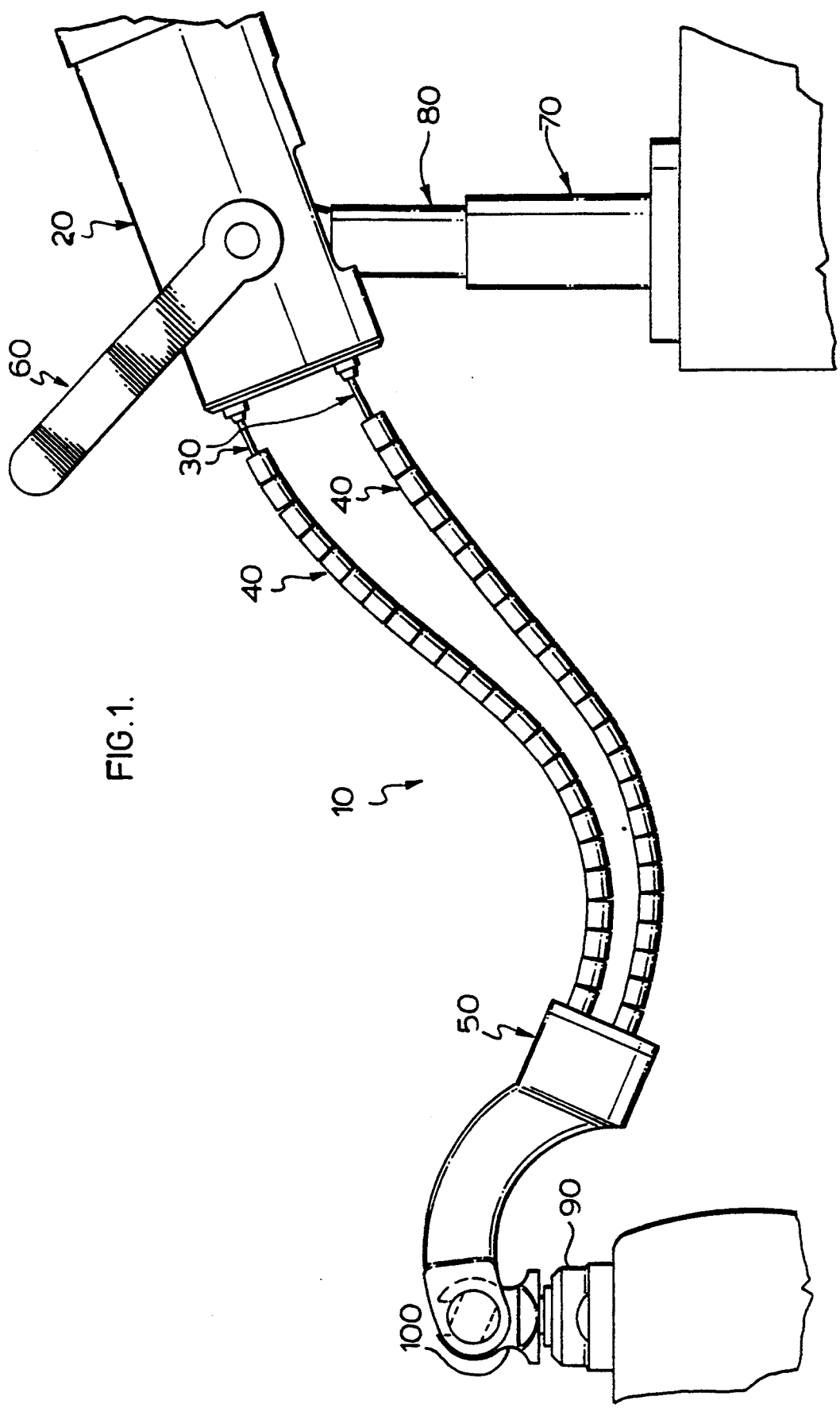

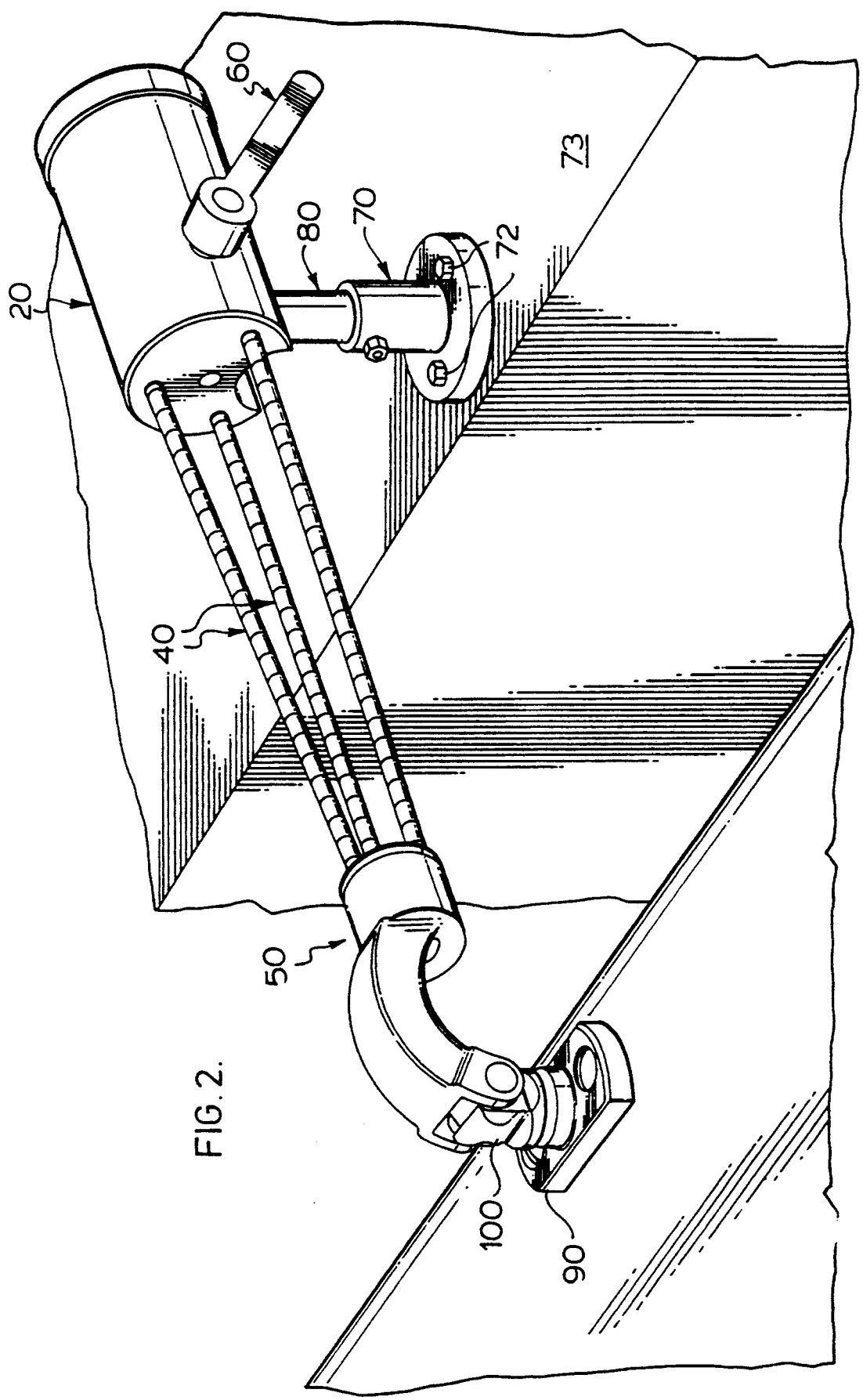

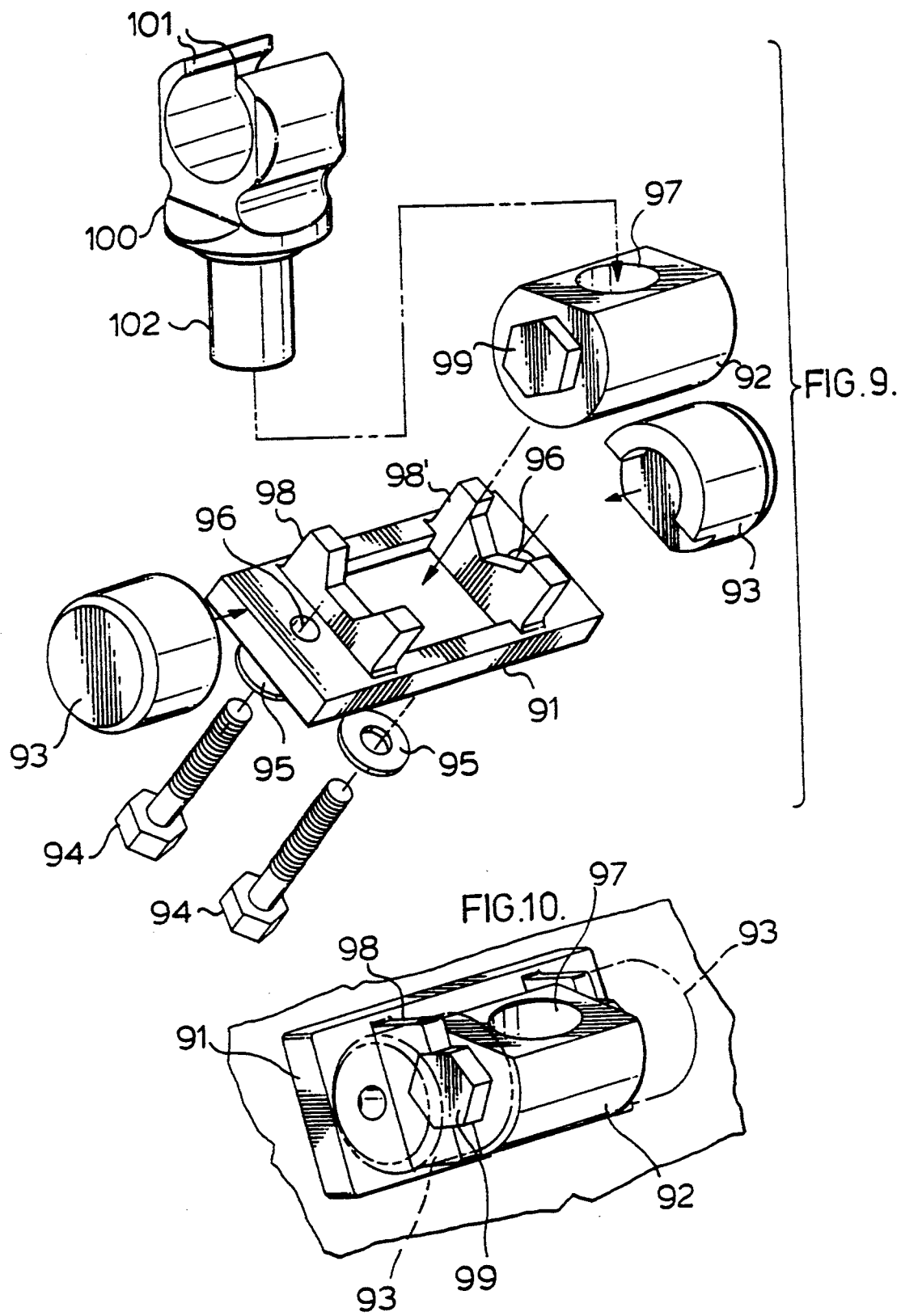

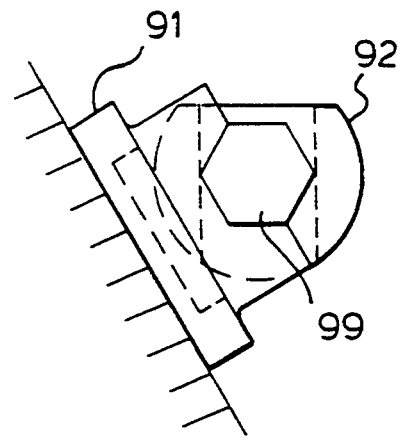
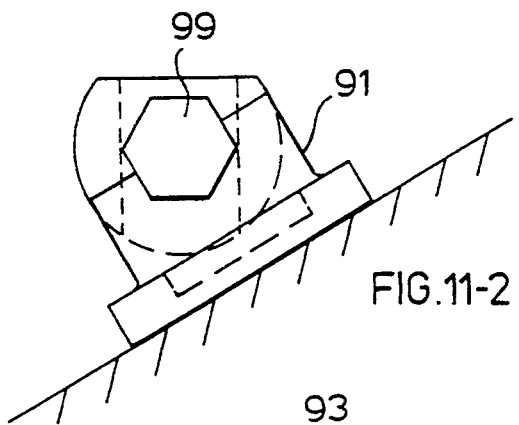
FIG.11-1
FIG.11-2
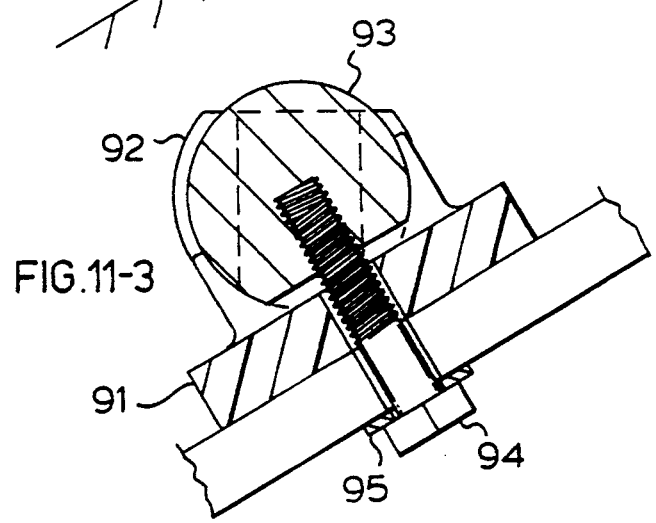
FIG.11-3
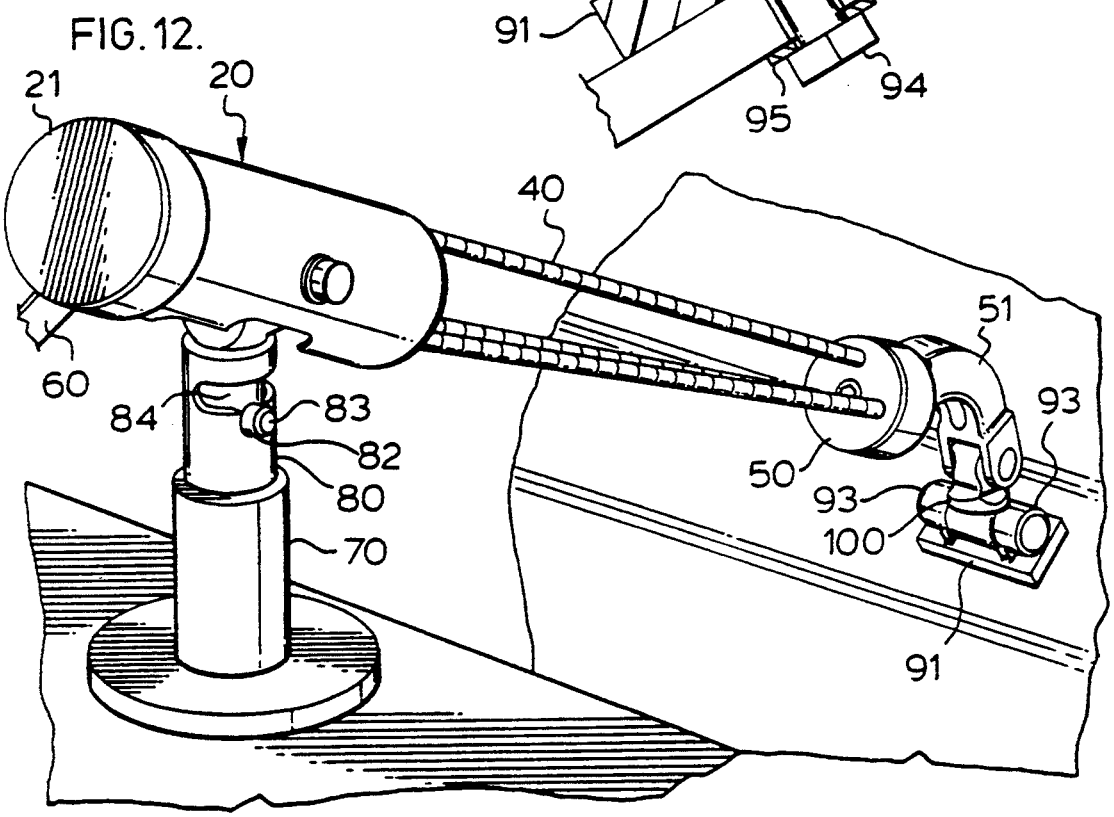
FIG.12.

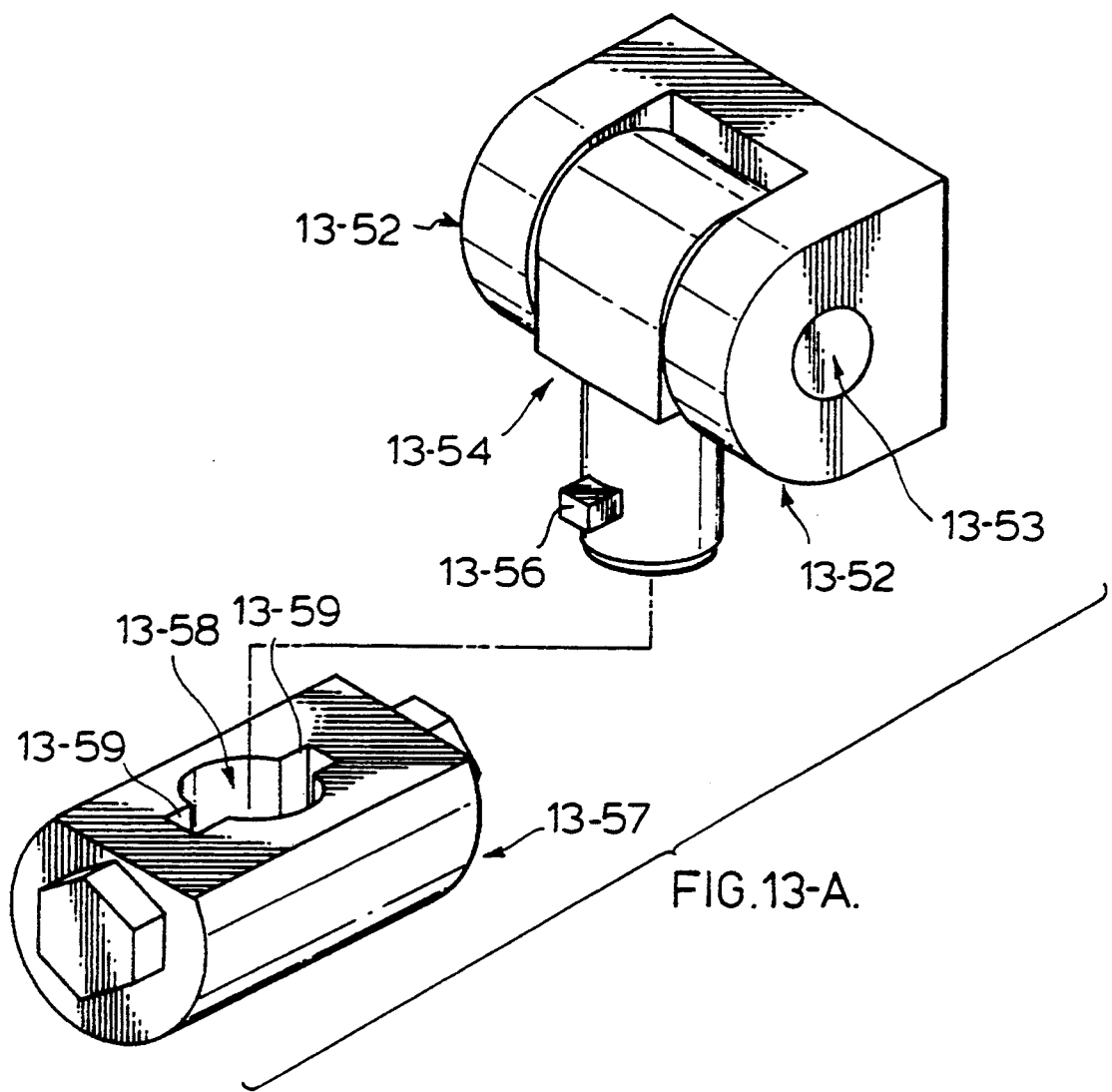
FIG.13-A.
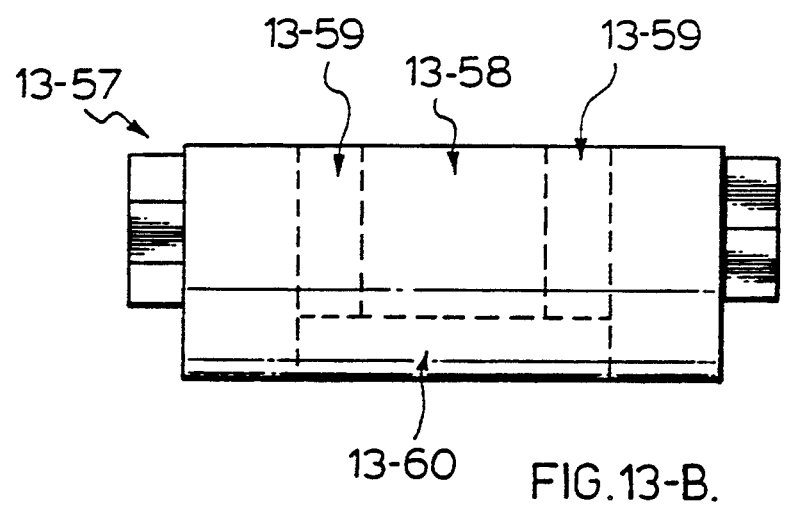
FIG.13-B.

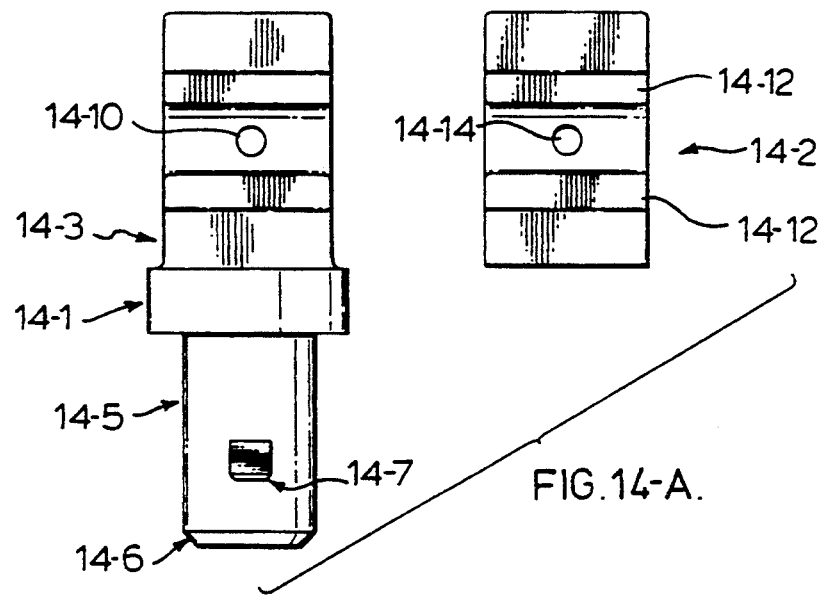
FIG.14-A.
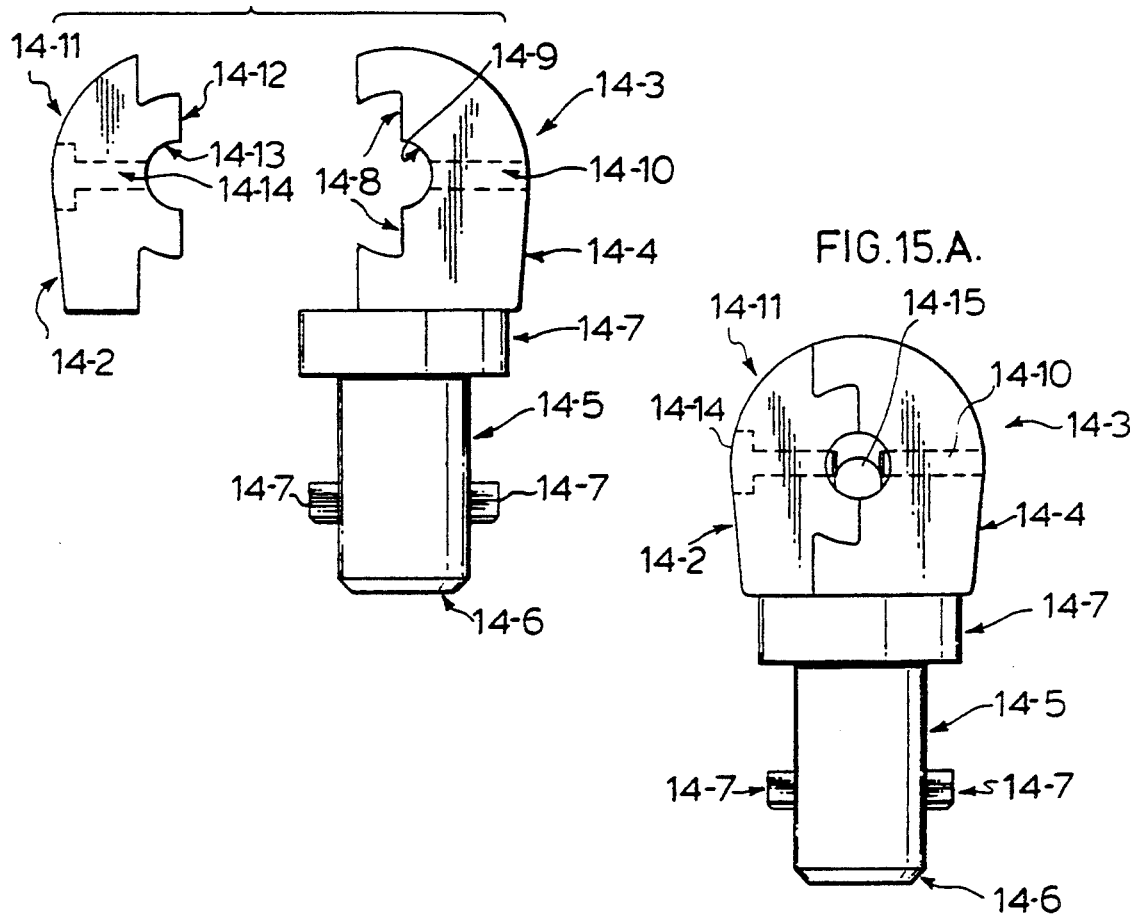
FIG.14-B.
FIG.15.A.

ATTACHMENT TO ADAPT AN ELONGATED MEMBER

FIELD OF THE INVENTION

This invention is a continuation in part of my copending patent application Ser. No. 07/894,903, filed Jun. 8, 1992, now abandoned hereby incorporated by reference.

BACKGROUND OF THE INVENTION

In the mooring of boats and ships, the prior art has been to use a rigid arm to be pivotally connected to a dock and the other end having a connector to be connected to the boat or ship for docking and mooring purposes. The rigid connecting arm is difficult to attach to a boat, while the boat is violently rocking in turbulent water. Most of the prior art devices consist of latching mechanisms at the connector end which would appear to be difficult to attach to a boat in rough waters and appears to create a risk of possibly smashing the rigid arm mechanism through the hull of the boat or create the possibility of injuring the person trying to connect the mechanism in rough waters. Another draw back in the prior art is that in incorporating a rigid arm mechanism, you must reach well out from the dock in order to connect the mechanism. This may create a possible dangerous situation for the operator of the equipment as well. Another disadvantage of the prior art is that it does not allow sufficient movement of the attachment arm to accommodate the rise and fall of the water level in bodies of water.

Another common method in the prior art for mooring boats along the sides of docks and piers is tying the boat with ropes and preventing the boat from smashing or hitting against the dock by having a bumper or a rubber tire fixed between the boat and dock. A disadvantage of this method is that the constant movement of the boat will stretch or loosen the mooring ropes along the boat thus moving the boat to a position where it is not properly protected by the bumpers. Furthermore, the mooring ropes usually deteriorate over a period of time which creates the possibility that the ropes may break thus allowing the boat to drift away from the dock. Furthermore, incorporating the mooring methods of the prior art, as above, if the rope begins to deteriorate and the bumpers are disconnected from the boat, the boat could possibly be damaged by making hard contact with the dock.

The present invention in a preferred embodiment overcomes the disadvantages by providing a collapsible member in a boat mooring device or the like that can become rigid upon applying tension thereto and can become resilient upon relieving the tension thereupon.

SUMMARY OF THE INVENTION

It is an object of the invention to provide a collapsible member comprising a tensioning means, resilient means to be tensioned, said resilient means, preferably a strong cable or the like, being of a first predetermined length and being engaged with the tensioning means, rigidifying means, preferably a plurality of collars or a coil spring fitted over the resilient means, said rigidifying means being of a second collective predetermined length shorter than the first predetermined length located with said resilient means, and anchoring means to anchor an end of the resilient means to be tensioned, wherein moving said tensioning means to a first position provides sufficient tension of the resilient means such that the rigidifying means and the resilient means result in an overall length of said collapsible member substantially equal to the second collective predetermined length, wherein moving said tensioning means to a second position provides sufficient relief of tension of the resilient means such that the rigidifying means is untensioned resulting in an overall length of said collapsible member substantially equal to the first predetermined length, wherein in the tensioned position, the member cannot be manually bent or untensioned without moving said tension means to a second position.

In a preferred embodiment the coil spring has mating surfaces, such that the surfaces adjacent each other interengage when tension is applied to the resilient member, one engaging surface preferably having a male detent or the like, and the other engaging surface preferably having a complementary female groove or the like, such that when the resilient member is under tension, and the coil spring is compressed, the adjacent surfaces are interengaged by the male detent fitting into the female groove, thus forming a rigid member.

In yet still another preferred embodiment, the collapsible member is embodied in a hockey stick handle.

Yet still another object of the invention is to provide a hockey stick handle comprising a collapsible member comprising a tensioning means, preferably a nut and screw or means to convert rotational movement to linear movement, resilient means, preferably a strong cable or the like, to be tensioned, said resilient means being of a first predetermined length and being engaged with the tensioning means, rigidifying means, preferably a plurality of collars or the like fitted over the resilient means, being of a second collective predetermined length shorter than the first predetermined length located with said resilient means, and anchoring means to anchor an end of the resilient means to be tensioned, wherein moving said tensioning means to a first position provides sufficient tension of the resilient means such that the rigidifying means and the resilient means result in an overall length of said collapsible member substantially equal to the second collective predetermined length, wherein moving said tensioning means to a second position provides sufficient relief of tension of the resilient means such that the rigidifying means is untensioned resulting in an overall length of said collapsible member substantially equal to the first predetermined length, wherein in the tensioned position, the member cannot be manually bent or untensioned without moving said tension means to a second position.

In another preferred embodiment, the collapsible member is embodied in a mooring device wherein the resilient means is at least three steel cables or the like.

Yet another object of the invention is to provide a boat mooring device comprising a collapsible member comprising a tensioning means, resilient means, preferably a strong cable or the like, to be tensioned, said resilient means being of a first predetermined length and being engaged with the tensioning means, rigidifying means, preferably a plurality of collars or preferably a coil spring or the like fitted over the resilient means, being of a second collective predetermined length shorter than the first predetermined length located with said resilient means, and anchoring means to anchor an end of the resilient means to be tensioned, wherein moving said tensioning means to a first position provides sufficient tension of the resilient means such that the rigidifying means and the resilient means result in an overall length of said collapsible member substantially equal to the second collective predetermined length, wherein moving said tensioning means to a second position provides sufficient relief of tension of the resilient means such that the rigidifying means is untensioned resulting in an overall length of said collapsible member substantially equal to the first predetermined length, wherein in the tensioned position, the member cannot be manually bent or untensioned without moving said tension means to a second position.

In yet still another preferred embodiment, there is provided a boat mooring device comprising a base, a shaft having two ends, connected to said base at one end thereof and having a tensioner connected to the shaft end distant the base, said tensioner comprising a wheel, one end of a rod connected to said wheel, and another end of said rod connected to one end of at least two cables each being of a first predetermined length, at least two mating collars being of a second collective predetermined length shorter than the first predetermined length located with said cables, a connector to be connected to a receiver on a boat deck or hull located at the other end of the cables, wherein when the wheel is moved to a first position, tension is applied to the cables, causing the collars to matingly engage each other wherein said cables and said collars result in an overall length substantially equal to the second collective predetermined length forming a rigid member, wherein when the wheel is moved to a second position, the tension on the cables is relieved and the matingly engaged collars are relaxed resulting in an overall length equal to the first predetermined length wherein in the tensioned position, the cables cannot be manually bent or untensioned without moving said wheel to a second position.

Yet still another preferred embodiment provides a boat mooring device comprising a base, a shaft having two ends connected to said base at one end thereof and having a tensioner connected to the shaft end distant the base, said tensioner comprising means to convert rotational movement to linear movement connected to at least two cables each being of a first predetermined length, at least two mating collars being of a second collective predetermined length shorter than the first predetermined length located with said cables, a connector to be connected to a receiver on a boat deck or hull located at the other end of the cables, wherein when tension is applied to the cables, the collars matingly engage each other wherein said cables and said collars result in an overall length substantially equal to the second collective predetermined length forming a rigid member, wherein when the tension on the cables is relieved the matingly engaged collars are relaxed resulting in an overall length equal to the first predetermined length wherein in the tensioned position, the cables cannot be manually bent or untensioned without moving said wheel to a second position.

In any of the above mentioned embodiments, each collar or the like has two ends and the first end having a detent portion and preferably in the form of a male spigot, and the second end having a compatible detent portion and preferably in the form of a female spigot cavity, such that the male end of one collar engages and preferably fits into, the female end of another collar when tension is applied to the resilient member.

In any of the above mentioned embodiments, each collar further comprises a resilient biasing means preferably a rubber grommet or disc spring or the like preferably located with said female spigot cavity, to aid each collar in separating preferably to aid said male spigot in separating from said female spigot cavity when being untensioned or when already in the untensioned position.

A further object of the invention is to provide a cleat attachment for a boat hull or the like which can be mounted in angular positions to match the variety of angular positions of a boat deck or hull when moored, where the cleat attachment has a base or a pillow block or the like having receiving means for a journal block which is preferably cylindrical, said journal block further comprises a rotatably attached cleat which is able to rotate 360 degrees in the plane formed with the journal block, said journal block having on each end thereof detent means to be received into the receiving means of the pillow block, preferably each detent means is a geometrically shaped polygon preferably a hexagon or octagon or the like, said receiving means preferably having a complementary geometrical shape to receive the detent means, preferably each receiving means is rotated such that each receiving means sits one half an index position out of location to the other, wherein when the journal block is rotated, the required angle for the attachment of a cleat connector is achieved to result in a secure attachment of the connector to the cleat, no matter what the angle of the boat deck or hull.

It is yet a further object of the invention to provide an attachment for a rope or cable or the like to adapt a rope or cable or the like such that it can be used with the cleat attachment, the attachment preferably comprising two mating parts which when assembled is fitted over the length of a rope or cable or the like and forms a member having preferably four sides where the two opposite sides are flat and planar and parallel to each other and the other opposite two sides are bowed outwardly.

It is another object of the invention to provide an attachment to adapt an elongated member to be used with a female receptacle having cleat receiving means, the attachment comprising at least two mating parts which when assembled fit over a segment of the elongated member forming a cleat when assembled having two ends and having a male portion dispose proximate one end thereof remote said segment, said male portion to be received in said female receptacle preferably said male portion further comprises guiding means preferably at least two keys to guide said cleat in cooperating guide means with said female receptacle.

In a preferred embodiment, said male portion preferably further comprises securing means preferably at least two keys, to secure said cleat in cooperating securing means disposed with said female receptacle.

In a preferred embodiment, said mating parts referred in the application are preferably further secured by a screw.

Yet still it is another object of the invention to provide an attachment to adapt a rope or cable so as to be useable with a female receptacle having cleat receiving means, the attachment comprising at least two cooperating parts which when assembled fit over a segment of the rope or cable and forming a cleat when assembled having two ends and having a male portion disposed proximate one end thereof remote said segment; said male portion preferably further comprises guiding means preferably comprising at least two keys, to guide said cleat when assemble in said female receptacle said male portion to be received in said female receptacle; one of said at least two cooperating parts further comprising a first portion having rope or cable receiving means proximate one end thereof female cleat receptacle engaging means proximate the other end thereof and having detent means thereon distant the end of said rope or cable receiving means; another of said at least two cooperating parts further comprising a second portion having rope or cable receiving means cooperating with said first portion forming an aperture for passage of said rope or cable, said first and second portions being furthered secured by securing means which further secures said rope or cable with said first and second portions.

Yet still in a preferred embodiment, there is provided an attachment to adapt an elongated member for use with a cleat attachment said cleat attachment having cooperating receiving means, the attachment for said elongated member comprising at least two mating parts which when assembled fits over a segment of said elongated member forming a sleeve or collar when assembled having at least four sides where the two opposite sides are substantially flat and planar and substantially parallel to each other, and the other two opposite sides are substantially bowed outwardly thus allowing said elongated member to securely engage with the cooperating receiving means of the cleat attachment said cleat attachment cooperating receiving means to receive said sleeve or collar when assembled.

In a preferred embodiment, said sleeve or collar when received by said receiving means of said cleat attachment is allowed to rotate a predetermined number of degrees or at least one axis while securely engaged with said receiving means.

In a preferred embodiment, said cooperating receiving means is rotatable on an axis substantially perpendicular to the at least one axis of rotation of said sleeve and is substantially C-shaped, preferably the distance of the opening of said C-shaped cooperating receiving means is complimentary to the distance formed by the two opposite substantially sides flat, and parallel to each other, and the diameter formed by the C-shaped receiving means is complementary to the distance formed by the other two opposite sides substantially bowed outwardly, therein allowing said attachment to rotate a predetermined number of degrees within said receiving means while securely engaged therewith.

In yet another preferred embodiment, there is provided and attachment to adapt a rope or cable for use with a cleat attachment, the attachment for said rope or cable comprising two mating parts which when assembled fit over a segment of said rope or cable forming a sleeve having two ends, where proximate each end comprises a collar having a first diameter and intermediate said collar, said sleeve comprises two opposite and parallel flat sides of a first thickness and two opposite outwardly bowed sides forming a second diameter; wherein said second diameter is substantially smaller than said first diameter; said cleat attachment further comprising a cleat rotatably attached to a base; said cleat being substantially C-shaped having an inner diameter substantially larger than said second diameter; an opening having a distance substantially greater than the first thickness, thus allowing the entry of said sleeve or collar by orienting the two opposite and parallel flat sides with said opening, and then rotating said collar or sleeve causing the two opposite outwardly bowed sides to fit rotatably fit within said C-shaped cleat.

In a preferred embodiment, said sleeve or collar further comprises detent means thereon to prevent said sleeve or collar from being removed longitudinally from said cleat attachment.

Further and other objects of the invention will become apparent to a man skilled in the art from the following specification.

BRIEF DESCRIPTION OF THE DRAWINGS

FIG. 2 is a perspective view of the collapsible member in a preferred embodiment in use as a boat mooring device in the rigid position.

FIG. 8-1 is a cross-sectional view of the collars in a preferred embodiment.

FIG. 9 is an exploded view of the cleat attachment parts.

FIG. 10 is a view of FIG. 9 with the cleat attachment assembled.

FIGS. 11.1, 11.2, and 11.3 are side views of the cleat attachment when assembled in different angular positions.

FIG. 12 is the boat mooring device in the locked and tensed position when used with the cleat attachment.

FIG. 13A is a perspective view of the cleat and cleat receptacle showing the bores and key slots in a preferred embodiment.

FIG. 13B is a sid cross view of the cleat receptacle showing the bores and key slots in a preferred embodiment.

FIG. 14A and 14B, there is shown two views of an attachment to adapt an elongated member in a preferred embodiment when usassembled.

FIG. 15, there is shown an attachment to adapt an elongated member in a preferred embodiment when assembled.

DETAILED DESCRIPTION OF PREFERRED EMBODIMENTS OF THE INVENTION

Figure 7:
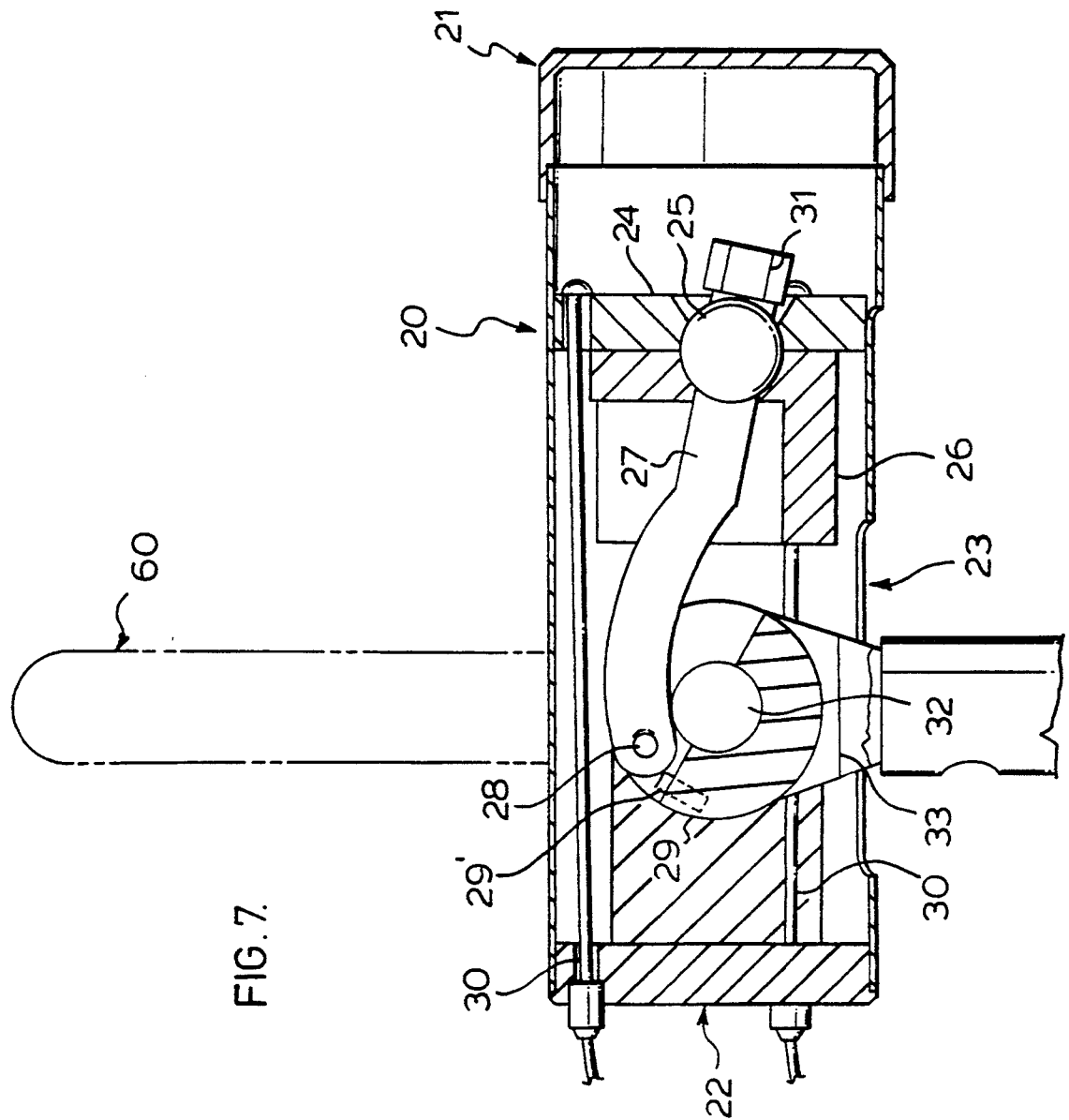
FIG. 7 is a partial cross-sectional view of the tensioning device in the untensioned position.
Figure 8:
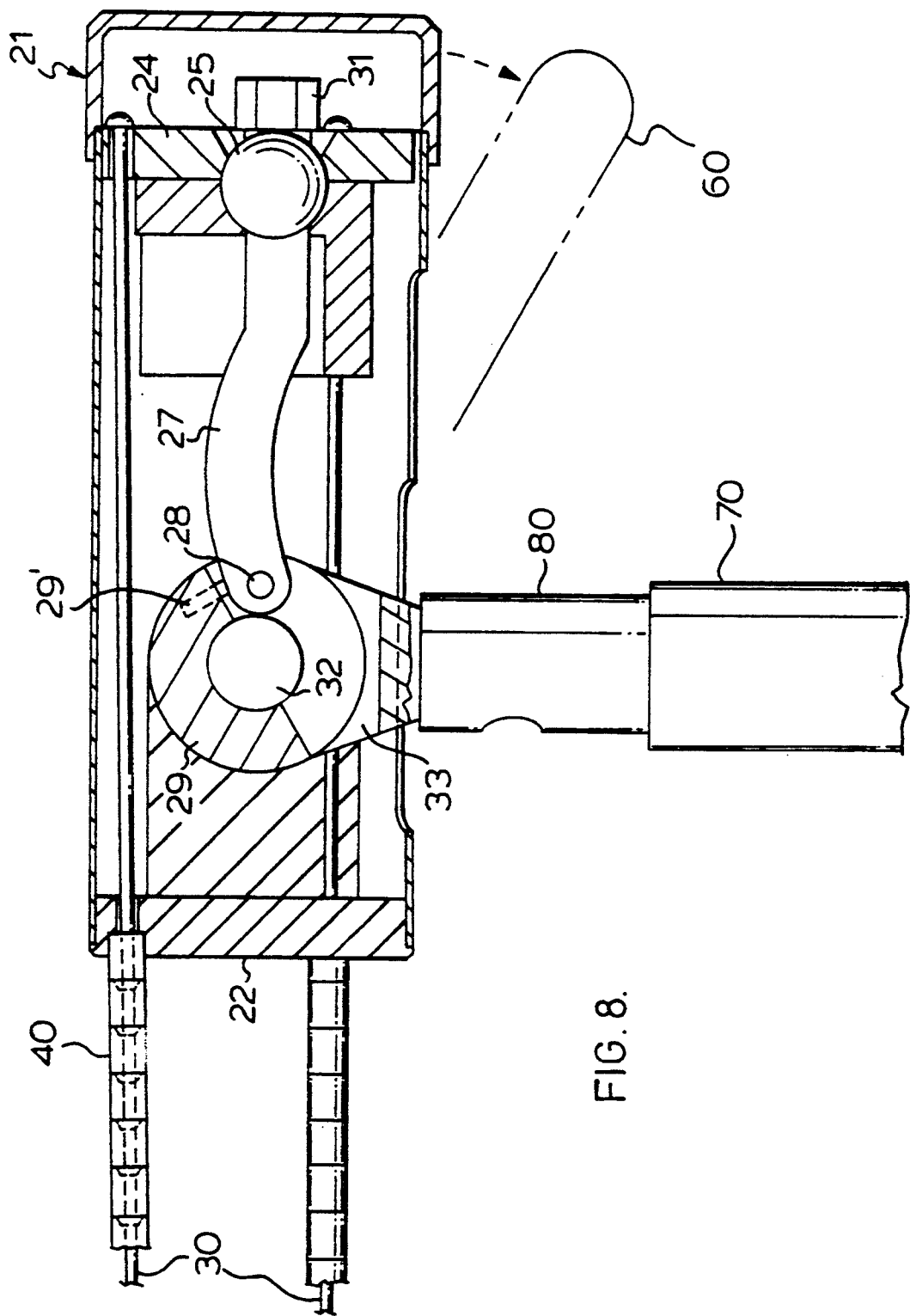
FIG. 8 is a partial cross-sectional view of the tensioning device in the tensioned position.
Figures 1, 8:
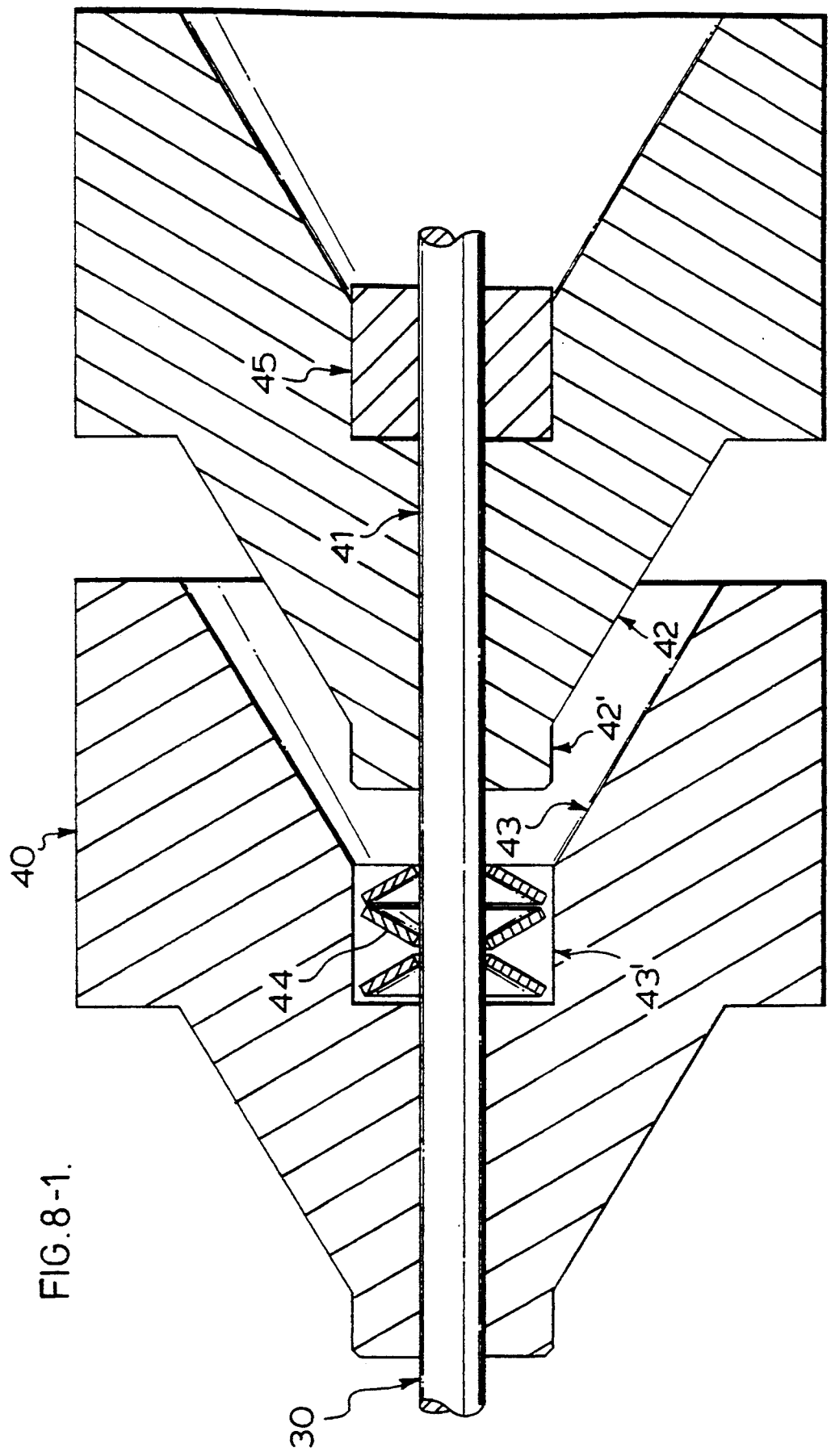
FIG. 1 is a side view of the collapsible member in a preferred embodiment in use as a boat mooring device in the collapse position.

Referring to FIG. 1 and FIG. 2 there is seen a boat mooring device generally denoted as 10 having a tension housing 20 and attached thereto three resilient cables 30 preferably made out of steel or the like and each cable having a series of collars 40 running along the length of each of the cables 30. At the end of each of the cables 30 distant the tension housing 20 there is a connector 50 for connection to a cleat 100. The cables 30 are connected to the connector 50, such that the diameter formed by the end of the three cables 30 connected to the tension housing 20 is preferable two times greater than the diameter formed by the end of the three cables 30 connected to the connector 50 creating a substantially conically shaped shah or the like when in the tensioned position. The collars 40 are kept on each of the cables 30 by the connector 50 and the front cap 22. In FIG. 1 the handle 60 located on the tension housing 20 and connected to pin 32 (as seen in FIGS. 7 and 8) is in a first position showing each of the resilient cables 30 and collars 40 in the collapsed and relaxed position. Referring now to FIG. 2, moving the handle 60 to a second position, the resilient cables 30 are tensioned and in turn the collars 40 interengage with each other forming a rigid member and in turn provide a fixed distance between the tension housing 20 and the cleat 100. As best seen in FIG. 8-1 in a preferred embodiment, each of the collars 40, preferably made of a suitable metal or the like, has a longitudinally central hole 41, a tapered male spigot 42 having a pilot or the like 42' at one end thereof and a mating tapered female cavity 43 having a complementary female pilot cavity 43' at the other end such that when tension is applied to the cables 30 the male spigot 42 and male pilot 42' interengages with the female cavity 43 and female pilot cavity 43' such that when sufficient tension is applied to the cables 30, a rigid member is formed. The male pilot once engaged with the female pilot cavity 43' also aids in the rigidity of the member in the tensioned position. The female pilot cavity 43' has located therein a substantially annular disc spring 44 or rubber grommet 45 or the like which aids the male spigot 42 and pilot 42' out of the female cavity 43 and female pilot cavity 43' respectively. The collars 40 can have different cross-sectional structures (i.e. a rectangular cross-section).

Figure 3:
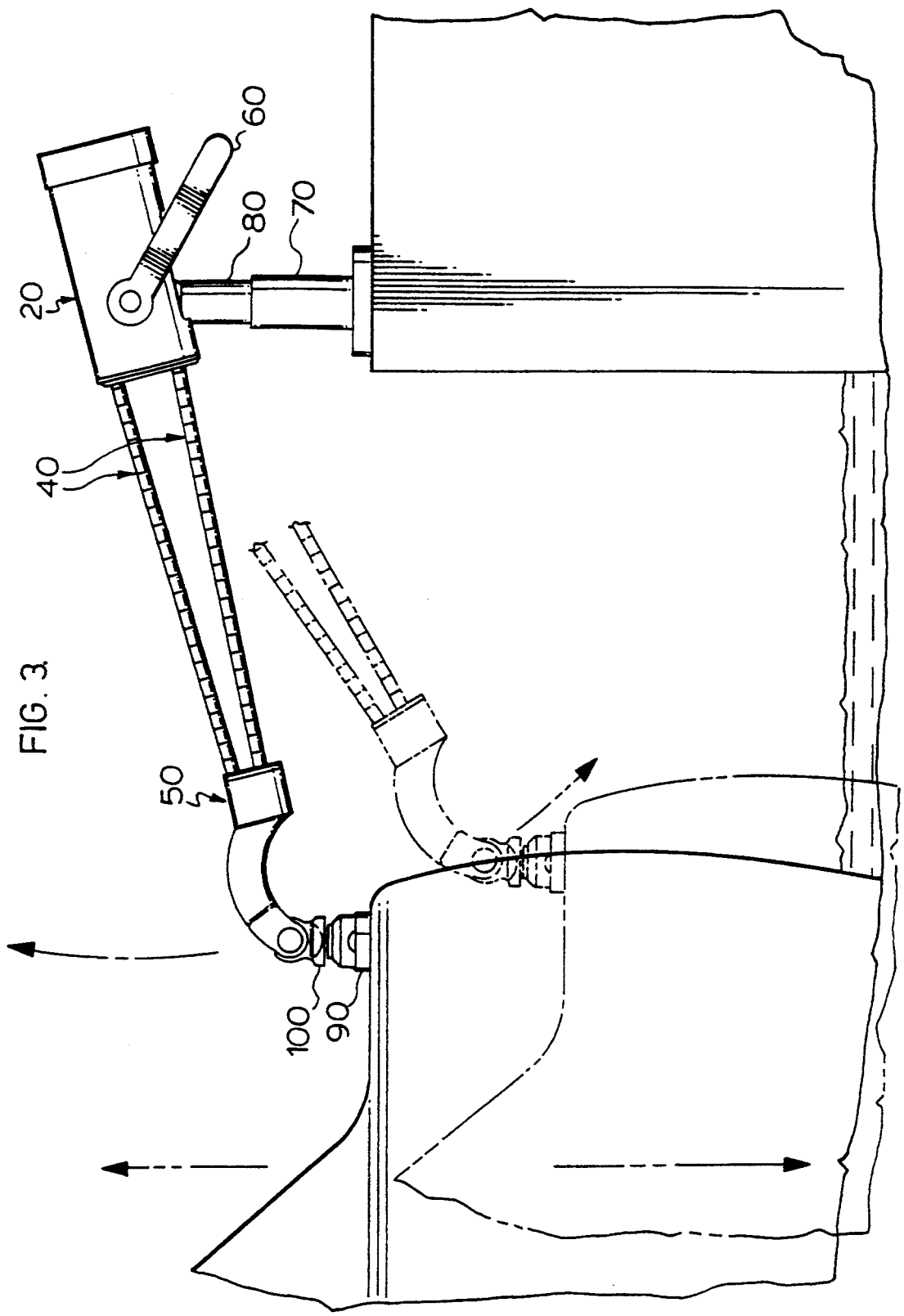
FIG. 3 is a side view of the invention in a preferred embodiment in use as a boat mooring device in the rigid position showing the invention and how it functions with the rising and lowering of the tide.
Figure 4:
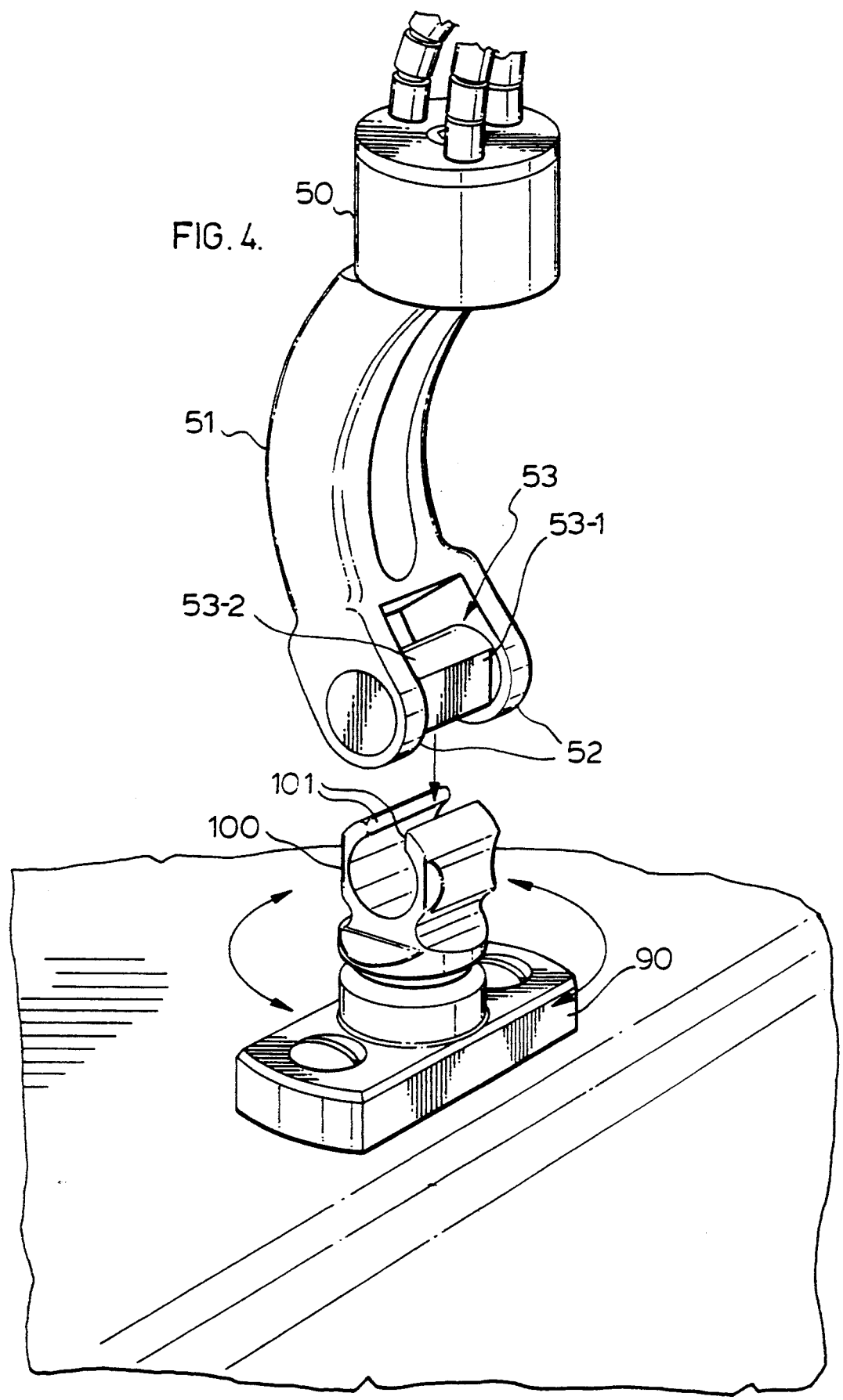
FIG. 4 is an exploded view of the insertion of the connector from the boat mooring device into the cleat.
Figure 5:
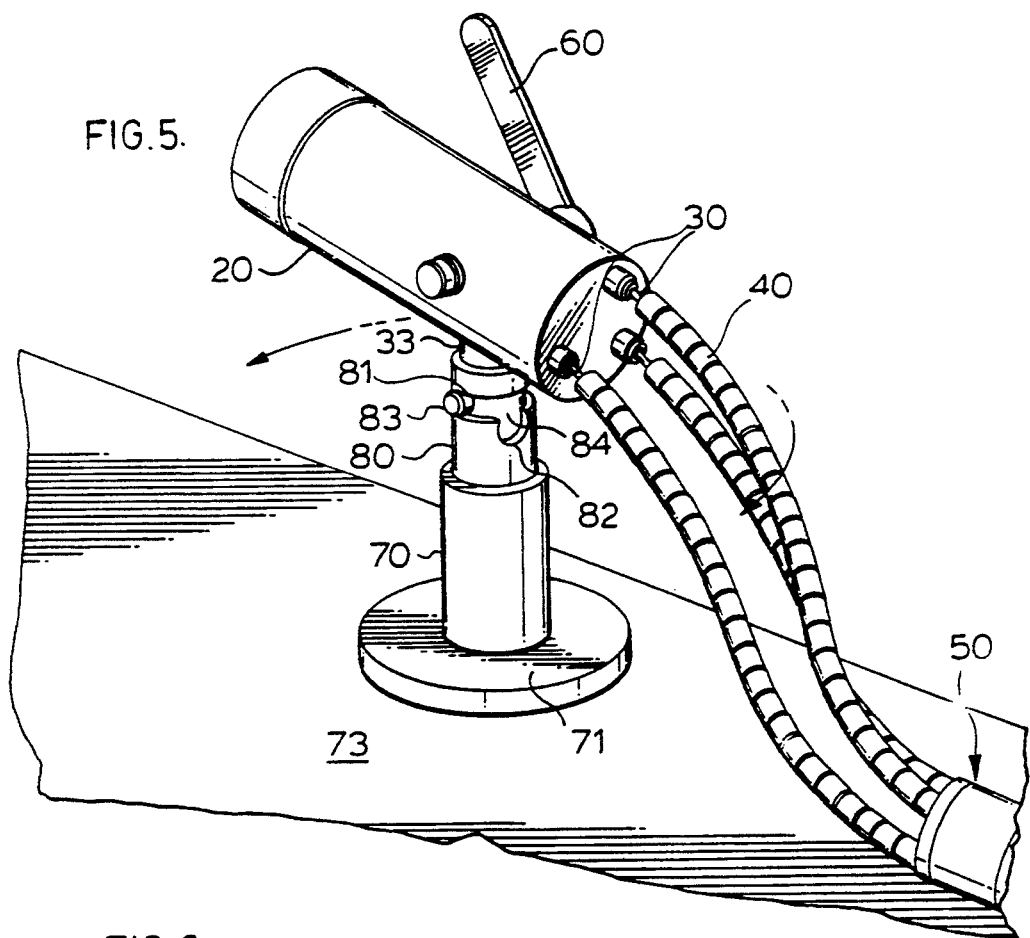
FIG. 5 is a perspective view of the boat mooring device in the collapse position and in the unlocked position.
Figure 6:
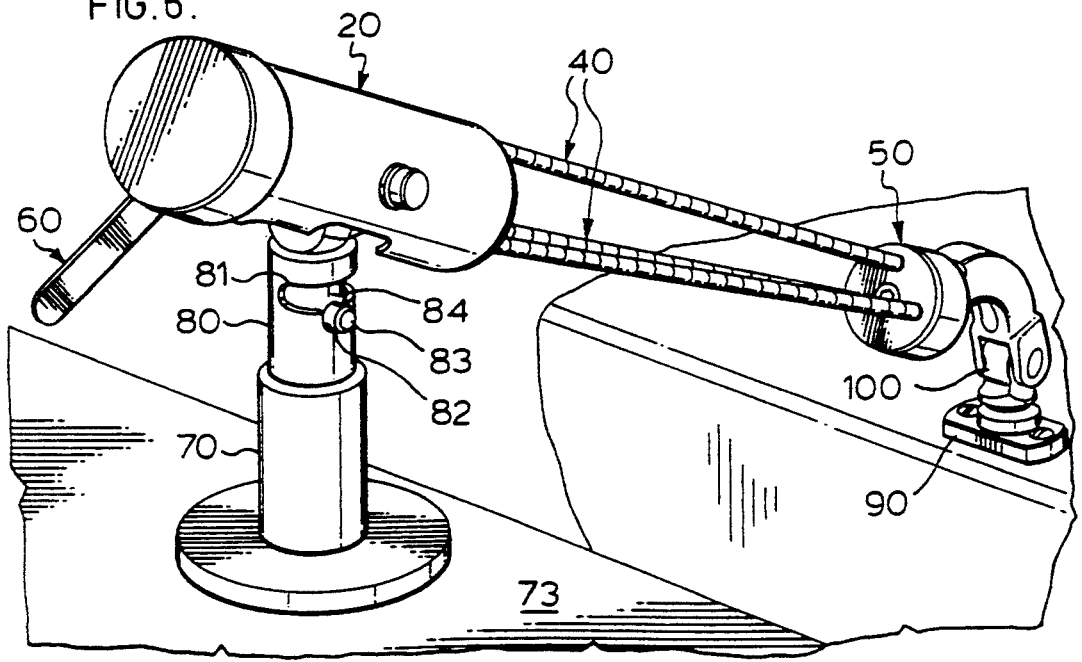
FIG. 6 is a perspective view of the boat mooring device in the locked and rigid position.

Referring now to FIGS. 2,5,6, 7 and 8 the mooring device is mounted to a platform such as a dock 73 by inserting a yoke 33 into a hollow shaft 80 which is inserted into a hollow shaft 70 having a circular base 71. Shaft 80 is locked into shaft 70 preferably by a nut and bolt or welding or the like. The hollow shah 70 is connected to the dock by nuts and bolts 72 going through the base 71 and into the dock 73. Proximate the end of the shaft 80 distant the base 71 there is a slot 81 running horizontally for substantially 180 degrees around the shaft 80, and along the lower portion of the slot 81 there is a vertical slot 82 substantially shorter than the horizontal slot 81 and being substantially normal to the slot 81. Yoke 33 is connected to the tension housing 20. Yoke 33 has on the end distant the tension housing 20 a detent 83 which rides along the slot 81 to provide substantial horizontal movement of the tension housing 20 and locks into slot 82 to prevent horizontal movement of the tension housing 20 once the connector 50 has been connected to the cleat 100 and the cables 30 have been tensioned and the collars 40 rigidified. The yoke 33 end distant the detent 83 and proximate the tension housing 20 holds a camlock bushing 29 which is held in place by a pin 32. One end of a crank 27 is pivotally connected to the camlock bushing 29 by a pin 28. The other end of the crank 27 is threaded and connected to a ball joint. The ball joint 25 is inserted into a clamp plate 26 and tension plate 24 as best seen in FIGS. 7 and 8. The clamp plate 26 and the tension plate 24 both have a semi spherical cavity which when fastened together by a bolt or the like form a spherical cavity allowing for the spherical portion of the ball joint 25 to fit into the formed cavity. The ball joint 25 can move freely in the formed cavity. Referring now to FIGS. 7,8 and 18 the cables 30 enter into the tension housing 20 via equidistant holes in the front cap 22 and terminate at the tension plate 24. A handle 60 is connected to the camlock bushing 29 via pin 32 which when said handle 60 is turned to a first position the camlock bushing 29 is caused to rotate and in turn the crank 26 is moved which in turn causes the tension plate 24 to move towards the end cap 21. On the camlock bushing 28 is located a stop screw 29' which can be adjusted against the top edge of the crank to obtain an ideal locked position. Since the cables 30 are connected to the tension plate 24 the movement of the tension plate 24 towards the end cap 21 causes the cables 30 to be tensioned which in turn causes the collars 40 on the cables 30 to matingly interengage with each other thus forming a rigid member. The tensioned position can best be seen in FIG. 8. Similarly to relieve the tension, moving the handle 60 to the original position will cause the camlock bushing 29 to rotate which in turn will cause the crank 27 to be moved towards the front cap 22 of the tension housing 20 which in turn will cause the tension plate 24 to be moved towards the front cap 22 of the tension housing 20 which in turn will relieve the tension on each of the cables 30 and will allow each of the collars 40 to separate and relax resulting in a flexible member. A nut 31 on the ball joint 25 is also used to tighten the cables 30 if after some use the cables 30 have stretched such that when the handle 60 is in the tensioned position there is not enough tension to cause the cables 30 to be tensioned enough to form a rigid member. The cables 30 are connected to the tension plate 24 in any suitable manner to prevent unwanted disconnection of the cables 30 from the tension plate 24. A preferred method to connect the cables 30 to the tension plate 24 is to provide a swage fitting(not shown) which is swaged to the ends of each of the cables 30. The end cap 21 is pressed over the housing 20 and is used to prevent exposure of the internal workings of the tension housing 20 to the elements and also to provide access to the nut 31 to tighten or loosen the cables 30 on the tension plate 24. The front cap 22 is also pivotally connected to the yoke 33 by the flanges 22', each flange having a hole 22" which is held in place on the yoke 33 by the pin 32 and allows the tension housing 20 to freely pivot vertically on the yoke 33 without affecting the camlock bushing 29 or the position of the tension plate 24. Thus, as best seen in FIG. 3, the tension housing 20 can pivot vertically while maintaining the tension on each of the cables 30. This allows the boat to rise and fall with the rising and lowering of the tide while moored. The connector 50 as best seen in FIG. 4 has an arcuate arm 51 at the end distant the cables 30. The arm 51 has two fingers 52 extending along the length of the connector 50 where the two fingers are connected to each other by a transverse member 53. The transverse member 53 has four sides with two opposite sides 53-1 being flat and planar and the other two sides 53-2 being bowed outwardly. The transverse member 53 is inserted into the cleat 100 where the flat and planar sides 53-1 of the transverse member 53 allow the transverse member 53 to fit into the opening 101 of the cleat 100. The transverse member 53 will not fit into the cleat 100 without rotating the connector 50 to align the planar and flat sides 53-1 of the transverse member 53 with the opening 101 of the cleat 100. Once the transverse member 53 is inserted in the cleat 100, rotation of the connector 50 90 degrees downwardly causes rotation of the transverse member 53 in the cleat 100 such that the outwardly bowed sides 53-2 of the transverse member 53 form a snug fit within the cleat 100 and disallows the removal of the connector 50 from the cleat 100 and also maintains the flat and planar sides 53-1 in a parallel relationship with the horizontal centre line of the tension housing 20 when the detent 83 is in the slot 82 and the handle 60 is in the tensioned position without rotation of the connector 50 90 degrees upwardly. The cleat 100 can rotate within the cleat base 90 along the horizontal plane to allow for ease of insertion during rough waters.

Furthermore, as best seen in FIG. 3, the tide can rise and fall and the mooring device will rotated in the vertical plane to allow for the rising and lowering of the tide and the transverse member 53 will rotate within the cleat 100 without being released from the cleat 100. In effect, the cleat opening 101 would have to be parallel to the flat and planar sides 53-1 of the transverse member 53 to be released. (i.e., the boat would have to be on its side.)

In use, it is preferred to have a boat mooring device near the front of the boat, and a boat mooring device near the back of the boat.

Referring now to FIG. 9 there is shown a preferred embodiment of the multi-angular boat cleat attachment comprising a rectangular pillow block 91 having two vertical legs 98 and 98' equally spaced on one face of the pillow block 91. Each leg has a geometrical shaped cutout (i.e. a hexagon, octagon, etc.) such that the cutout in one leg is offset one half of an index position out of location to its opposite leg. The pillow block 91 has two bolt holes 96 so the pillow block 91 can be bolted to the hull of a boat or ship. A cylindrical journal block 92 has two ends and each end has a journal 99 and 99' (not shown) corresponding to the cutout of each vertical leg 98 and 98' of the pillow block 91, such that the journals 99 and 99' fit in a mating relationship with the cutout of the vertical legs 98 and 98' respectively. The pillow block 91 also has a bored hole 97 running transverse and substantially normal to the length of the cylindrical journal block 92. The cleat 100 has a shaft 102 where said shaft 102 is inserted and rotatably fastened into the bored hole 97 to allow the cleat 100 to rotate 360 degrees in the plane formed with the journal block 92. The cylindrical journal block 92 and the cleat 100 when assembled are placed onto the pillow block 91 and held in place by clamp bushings 93 preferably with the same bolts 94 used to fasten the pillow block 91 onto the surface of a hull of a boat or ship. In use, the movement of the cylindrical journal block 92 within the pillow block 91 will allow the user to modify the journal block 92 such that the opening 101 of the cleat 100 when inserted into the bored hole 97 will be positioned in the required position regardless of the angular shape of the boat deck or hull. The number of angular position settings can be doubled by reversing the journal block 92, end for end, in the pillow block 91 due to the offset positions of the cutouts of the vertical legs 98 and 98'. FIGS. 11-1, 11-2 and 11-3 show the cleat attachment on various angled surfaces with the journal block 92 and the cleat 100 set in a preferred position. Fastening the clamp bushings 93 to the pillow block 91 will lock the position of the journal block 92 as desired. FIG. 12 shows the cleat attachment when used with the boat mooring device.

Figure 13:
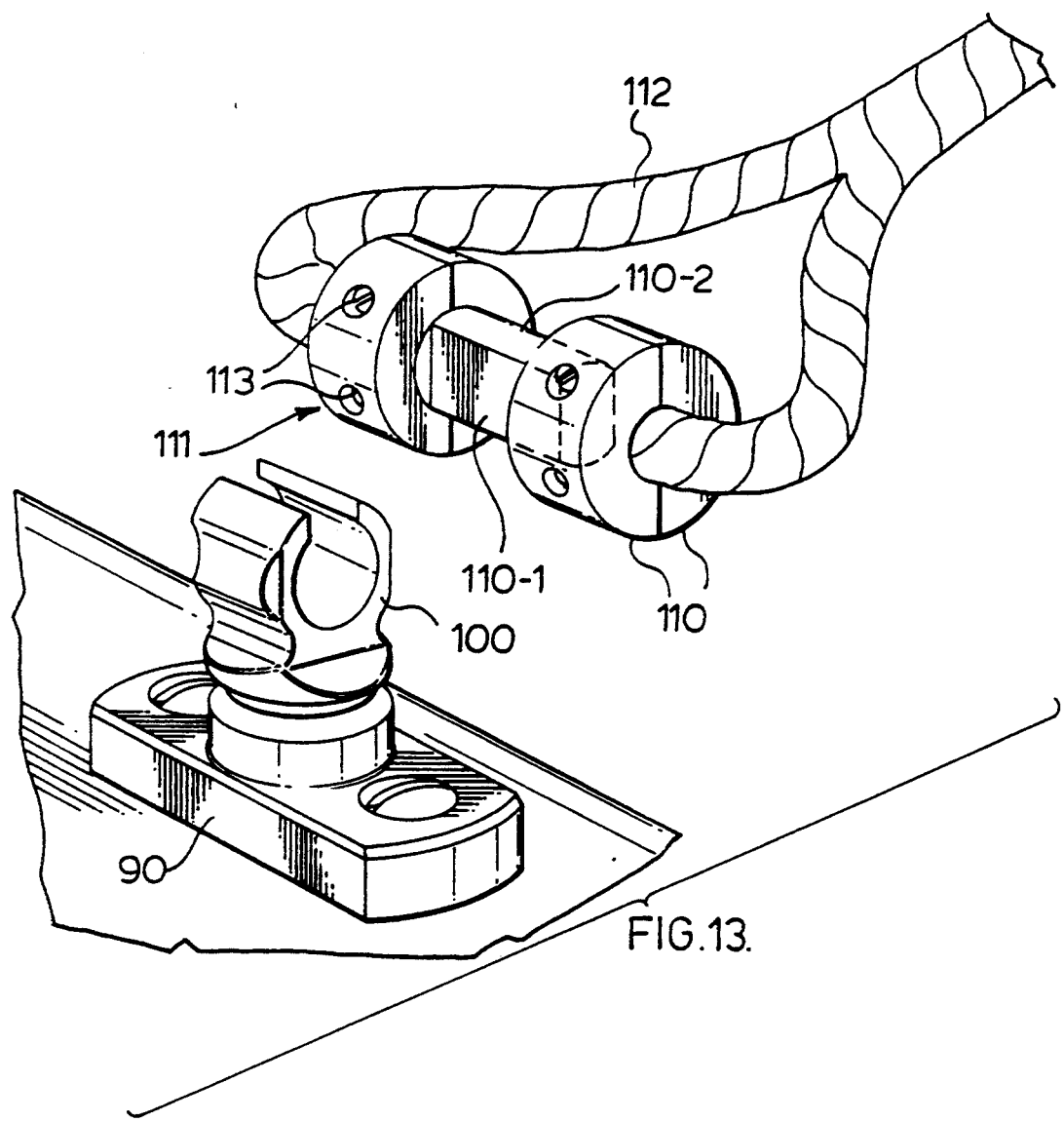
FIG. 13 is a perspective view of the attachment to adapt a rope or cable or the like for use use with the cleat.

FIG. 13 shows an attachment 111 to adapt a rope 112 in order to use the rope 112 with the cleat attachment or the like, the attachment 111 is made of two mating pieces 110 that fit over a rope 112 to use the multi-angular adjustable cleat attachment or any cleat attachment with a conventional rope 112. The two mating pieces 110 are fastened together over the length of a rope 112 by four screws 113. The shape of the attachment when assembled is similar to the shape of the transverse member 53 having two flat and planar opposite sides 110-1 and two outwardly bowed sides 110-2 such that the attachment 111 can only fit into the cleat 100 when the two flat and planar sides 110-1 are aligned with the opening 101 of the cleat 100. Then upon rotation of the attachment 111 substantially 90 degrees, will cause the outwardly bowed sides 110-2 to be in a snug fit arrangement within the cleat 100.

There are also detent means provided at the ends of said attachment 111 to prevent the intermediate portion of the attachment 111 from slipping out of the cleat 100.

With reference now to FIG. 13 and 13A, there is shown the connector 13-50 similar to the one in the previous figures, whose arcuate arm 13-51 has two fingers 13-52 extending along the length of the connector 13-50 where the cleat 13-54 is rotatably attached to the two fingers 13-52 by a transverse retaining pin 13-53 which fits through an aperture 13-55 located on the cleat 13-54 proximate one end thereof, distant the end having two keys 13-56, allowing said cleat 13-54 to rotate along the axis of the retaining pin 13-53.

The cleat receptacle similar to the journal block of the previous figures excerpt that it 13-57 has a bore 13-58 larger in diameter of the cleat male portion 13-60. Running along the length of said bore 13-50, are two slots 13-59 complementary to the keys 13-56 where said slots 13-59 terminate to form a second bore 13-60 whose diameter is equivalent to the diameter formed by the two slots 13-59 of the first bore 13-58.

In effect, when a user wishes to connect the boat mooring device to a boat, the connector 13-50 can simply be brought towards the cleat receptacle 13-57 located on the boat hull or the like, align the cleat 13-54 and keys 13-56 with the bore 13-50 and key slots 13-59 respectively, and insert the cleat 13-54 into the first bore 13-58 until the cleat keys 13-56 reach the second bore 13-60, and then rotate the cleat 13-54 about 90° such that the keys 13-56 and the key slots 13-59 four 90° angles, and then tension the boat mooring device. To release the cleat 13-54 from the cleat receptacle 13-57, the reverse steps would be performed. It is understood that the cleat receptacle 13-57 would be connected to the boat hull as per the description of the cleat receptacle shown in FIGS. 9, 10, 11-1, 11-2 and 11-3. As can be seen from the Figures, the cleat 13-54 can be inserted into the cleat receptacle 13-57 with the connector 13-50 being substantially vertical or substantially horizontal due to the cleat 13-54 being rotatably attached thereto, thus facilitating the process of mooring a boat or the like. Furthermore, the low profile of the cleat receptacle 13-57 on the boat hull, may possibly reduce the risks of accidents incurred thereon.

Referring now to FIGS. 14A, 14B and 15 the attachment 14-1 is shown comprising two mating parts 14-2 and 14-3 the first part 14-3 comprises a half head portion 14-4 and a body portion 14-5 in the form of an elongated cylinder having a bevelled portion 14-6 at one end thereof. Along the side thereof, there are located two keys 14-7 opposite one another. The half head 14-4 is joined to the body 14-5 by a circular shoulder 14-7. The half head 14-4 has on one side thereof a curved surface, and on the other side female portion of a dovetail joint 14-8 and a half-bore 14-9 running centrally parallel to the female portion of a dovetail joint 14-8 and a bore 14-10 running centrally transverse to the female portion of a dovetail joint 14-8. The second part 14-2 comprises a curved surface 14-11 and a male portion of a dovetail joint 14-12, complementary to the female portion 14-8, with a half-bore 14-13 running centrally parallel to the male portion dovetail joint 14-12 and bore 14-14 running and centrally transverse to he male portion dovetail joint 14-12 when assembled. The male portion of the dovetail joint 14-12 will slide into engagement with the female portion of the dovetail joint 14-8 forming now a full head made up of the portions 14-4 and 14-2, defing a bore 14-15 formed by the half bores 14-9 and 14-13 which may receive a portion of an elongated member for example a rope or cable (not shown) either before, during or after assembly of the mating parts 14-2 and 14-3.

The bore formed by the bores 14-10 and 14-14 is used to further secure the mating parts 14-2 and 14-3 together, as well as secure the segment of the rope or cable (not shown) to the attachment 14-1. This can be accomplished with a screw or the like. As can be seen in the Figures, the bore for said screw has a portion 14-16 to allow a "flush-like" finish about the full head once the screw is fully tightened. Thus, in effect a sleeve or collar is formed about a rope or cable segment. Now, the rope or cable, adapted by the attachment 14-1 can be used in conjunction with a cleat receptacle such as shown in FIG. 13A and 13B.

As many changes can be made to the invention without departing from the scope of the invention, it is intended that all material contained herein be interpreted as illustrative of the invention and not in a limiting sense.

The embodiments of the invention in which an exclusive property or privilege is claimed are as follows:

1. An attachment to adapt a rope or cable so as to be useable with a female receptacle having cleat receiving means, the attachment comprising at least two cooperating parts which when assembled fit over a segment of the rope or cable and forming a cleat when assembled having two ends and having a male portion disposed proximate one end thereof remote said segment; said male portion to be received in said female receptacle; one of said at least two cooperating parts further comprising a first portion having rope or cable receiving means proximate one end thereof female cleat receptacle engaging means proximate the other end thereof and having detent means thereon distant the end of said rope or cable receiving means; another of said at least two cooperating parts further comprising a second portion having rope or cable receiving means cooperating with said first portion forming an aperture for passage of said rope or cable, said first and second portions being furthered secured by securing means which further secures said rope or cable with said first and second portions.

2. The attachment of claim 1 where said male portion further comprises guiding means to guide said cleat when assembled in said female receptacle.

3. The attachment of claim 2 when said guiding means comprises at least two keys.

4. An attachment to adapt a rope or cable for use with a cleat attachment, the attachment for said rope or cable comprising two mating parts which when assembled fit over a segment of said rope or cable forming a sleeve having two ends, where proximate each end comprises a collar having a first diameter and intermediate said collar, said sleeve comprises two opposite and parallel flat sides of a first thickness and two opposite outwardly bowed sides forming a second diameter; wherein said second diameter is substantially smaller than said first diameter; said cleat attachment further comprising a cleat rotatably attached to a base; said cleat being substantially C-shaped having an inner diameter substantially larger than said second diameter; an opening having a distance substantially greater than the first thickness, thus allowing the entry of said sleeve or collar by orienting the two opposite and parallel flat sides with said opening, and then rotating said collar or sleeve causing the two opposite outwardly bowed sides to fit rotatably fit within said C-shaped cleat.

5. The attachment of claim 4 wherein said sleeve or collar further comprises detent means thereon to prevent said sleeve or collar from being removed longitudinally from said cleat attachment.

6. An attachment to adapt an elongated member for use with a cleat attachment said cleat attachment having cooperating receiving means, the attachment for said elongated member comprising at least two mating parts which when assembled fits over a segment of said elongated member forming a sleeve or collar when assembled having at least four sides where the two opposite sides are substantially flat and planar and substantially parallel to each other, and the other two opposite sides are substantially bowed outwardly thus allowing said elongated member to securely engage with the cooperating receiving means of the cleat attachment, said cleat attachment cooperating receiving means to receive said sleeve or collar when assembled, wherein said cooperating receiving means is rotatable on an axis substantially perpendicular to the at least one axis of rotation of said sleeve and is substantially C-shaped, wherein the distance of the opening of said C-shaped cooperating receiving means is complimentary to the distance formed by the two opposite substantially sides flat, and parallel to each other, and the diameter formed by the C-shaped receiving means is complementary to the distance formed by the other two opposite sides substantially bowed outwardly, therein allowing said attachment to rotate a predetermined number of degrees within said receiving means while securely engaged therewith.

7. The attachment of claim 6 wherein said sleeve or collar when received by said receiving means of said cleat attachment is allowed to rotate a predetermined number of degrees on at least one axis while securely engaged with said receiving means.

* * * * *